(12) United States Patent
Henry (10) Patent No.: US 11,233,954 B1
(45) Date of Patent: Jan. 25, 2022

(54) STEREO INFRARED IMAGING FOR HEAD MOUNTED DEVICES

(71) Applicant: Rockwell Collins, Inc., Cedar Rapids, IA (US)

(72) Inventor: Daniel J. Henry, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 11 days.

(21) Appl. No.: 16/256,160

(22) Filed: Jan. 24, 2019

(51) Int. Cl.
| | |
|---|---|
| *H04N 5/33* | (2006.01) |
| *G02B 27/10* | (2006.01) |
| *G02B 27/01* | (2006.01) |
| *H04N 5/232* | (2006.01) |

(52) U.S. Cl.
CPC ......... *H04N 5/332* (2013.01); *G02B 27/0172* (2013.01); *G02B 27/1013* (2013.01); *G02B 27/1066* (2013.01); *H04N 5/23296* (2013.01); *G02B 2027/014* (2013.01); *G02B 2027/0138* (2013.01)

(58) Field of Classification Search
None
See application file for complete search history.

(56) References Cited

U.S. PATENT DOCUMENTS

| | | | | |
|---|---|---|---|---|
| 9,674,504 B1 * | 6/2017 | Salvagnini | ............ | G01S 7/4972 |
| 10,445,896 B1 * | 10/2019 | Bills | ........................ | G06T 11/40 |
| 2004/0119020 A1 * | 6/2004 | Bodkin | ................. | G01J 3/0278 250/353 |
| 2008/0011941 A1 | 1/2008 | Couture et al. | | |
| 2016/0050345 A1 * | 2/2016 | Longbotham | ...... | G02B 27/0172 348/47 |
| 2016/0088282 A1 * | 3/2016 | Sadi | ....................... | G03B 35/08 348/38 |
| 2017/0064291 A1 * | 3/2017 | Do | ........................ | H04N 13/324 |
| 2018/0039083 A1 * | 2/2018 | Miller | ................. | G02B 27/017 |
| 2018/0190022 A1 * | 7/2018 | Zamir | ................... | G06T 19/006 |
| 2018/0328727 A1 | 11/2018 | Suzuki et al. | | |

FOREIGN PATENT DOCUMENTS

WO    2014197109 A2    12/2014

OTHER PUBLICATIONS

Office Action dated May 25, 2020 for EP Application No. 20153722.2.

* cited by examiner

*Primary Examiner* — Kaitlin A Retallick
(74) *Attorney, Agent, or Firm* — Suiter Swantz pc llo (57) ABSTRACT

A stereoscopic system that employs stereo infrared imaging to improve resolution and field of view (FOV) is disclosed. In embodiments, the stereoscopic system includes first and second infrared cameras that are configured to detect scenery in the same FOV. The stereoscopic system further includes at least one display and at least one controller configured to render imagery from the first infrared camera and imagery from the second infrared camera via a display (or multiple displays) to generate stereoscopic infrared imagery.

19 Claims, 10 Drawing Sheets

214 — RECEIVING LIGHT VIA A FIRST COMMON APERTURE AT A FIRST BEAM SPLITTER CONFIGURED TO TRANSMIT RESPECTIVE PORTIONS OF THE LIGHT RECEIVED VIA THE FIRST COMMON APERTURE TO THE FIRST INFRARED CAMERA AND THE FIRST VISIBLE SPECTRUM CAMERA

216 — RECEIVING LIGHT VIA A SECOND COMMON APERTURE AT A SECOND BEAM SPLITTER CONFIGURED TO TRANSMIT RESPECTIVE PORTIONS OF THE LIGHT RECEIVED VIA THE SECOND COMMON APERTURE TO THE SECOND INFRARED CAMERA AND THE SECOND VISIBLE SPECTRUM CAMERA

STEREO INFRARED IMAGING FOR HEAD MOUNTED DEVICES

BACKGROUND

Performance requirements for head mounted devices (e.g., night vision goggles (NVG), mixed/augmented reality headsets, etc.) are driving the need for very high pixel count focal-plane arrays (FPAs) and high frame rate readout. A traditional design approach to this challenge requires development of new, higher performance infrared cameras. This may result in significantly higher cost per pixel and increased size, weight, and power (SWAP) requirements. Lower risk approaches, preferably those that employ commercial off-the-shelf (COTS) components, are preferred.

SUMMARY

In an aspect, embodiments of the inventive concepts disclosed herein are directed to a head mounted device that employs stereo infrared imaging to improve resolution and field of view (FOV), optionally using COTS infrared cameras. In embodiments, the head mounted device includes a headgear with first and second infrared cameras coupled to the headgear. The first infrared camera and the second infrared camera may be configured to detect scenery in the same FOV. The head mounted device further includes at least one display coupled to the headgear and at least one controller configured to render imagery from the first infrared camera and imagery from the second infrared camera via the display (or displays) to generate stereoscopic infrared imagery.

In another aspect, embodiments of the inventive concepts disclosed herein are more generally directed to a stereoscopic system. In embodiments, the stereoscopic system includes first and second infrared cameras that are configured to detect scenery in the same FOV. The stereoscopic system further includes at least one display and at least one controller configured to render imagery from the first infrared camera and imagery from the second infrared camera via the display (or displays) to generate stereoscopic infrared imagery.

In another aspect, implementations of the inventive concepts disclosed herein are directed to a method for stereoscopic imaging. In implementations, the method includes at least the steps of: detecting scenery in a field of view with a first infrared camera; detecting scenery in the same field of view as the first infrared camera with a second infrared camera; and rendering imagery from the first infrared camera and imagery from the second infrared camera via at least one display to generate stereoscopic infrared imagery.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a head mounted device that employs stereo infrared imaging to improve resolution and field of view (FOV), optionally using COTS infrared cameras.

Performance requirements for head mounted devices (e.g., night vision goggles (NVG), mixed/augmented reality headsets, etc.) are driving the need for very high pixel count focal-plane arrays (FPAs) and high frame rate readout. For example, current requirements include, but are not limited to, high resolution for detection, recognition, and/or identification of objects/people, wide FOV for situational awareness, and high frame rate to reduce blurring or smearing.

A traditional design approach to this challenge requires development of new, higher performance infrared cameras. High Resolution and wide FOV are diametrically opposed in the design space, so this drives the design to a higher pixel count. Moreover, to implement high frame rate, it may be necessary to have a fast read out from the high pixel count array. This may result in significantly higher cost per pixel and increased size, weight, and power (SWAP) requirements. Furthermore, a new camera design may incur technical, schedule, and cost risk.

Lower risk approaches, preferably those that employ commercial off-the-shelf (COTS) components, are preferred. Accordingly, the embodiments disclosed herein rely on stereo infrared imaging schemes that employ two or more (lower resolution) infrared cameras instead of using one very high resolution, high frame rate infrared camera.

For example, instead of using a single high resolution infrared camera (e.g., 900×900 FPA, 900×900=0.81 Megapixels), the stereo infrared imaging systems disclosed herein can employ two lower resolution infrared cameras (e.g., each having a 640×512 FPA, resulting in a combined 2×640×512=0.65 Megapixels). In embodiments, the FOV of the single (combined) high resolution array and each of the stereo arrays is made equivalent. The imagery detected by each of the sensors can be perceived as a fused image by the user. For example, the imagery can be presented in a manner that allows the user to perceive a merged stereoscopic image that includes the two lower resolution images detected by each of the infrared cameras.

Although this solution may still have a lower overall pixel count, multiple samples at lower resolution may provide enough improvement to meet the specifications with lower SWAP and lower development costs and/or risk. Furthermore, using two lower resolution infrared cameras to detect images will allow the user to perceive an average of both images, providing better sensitivity (e.g., improved noise equivalent temperature difference (NETD), signal to noise ratio (SNR), etc.) than a single imager, which will also offset the resolution disparity by enhancing the sensitivity of the overall device. In some embodiments, frame rate disparity can be mitigated (if necessary) by offsetting one of the cameras by ½ frame time with respect to the other, so that ½ of the composite image is updated at two times (2×) the rate of either input device.

Some advantages of the stereo infrared imaging systems disclosed herein may include, but are not limited to: lower size, weight, power, and cost (SWAP-C) and reduced risk even though there are two infrared cameras; high technology readiness level (TRL) and low recurring cost because lower resolution sensors are in high rate production (e.g., COTS infrared cameras); two lower resolution infrared cameras may still be smaller and lighter than a single high resolution camera because of the FPA requirements; power usage is likely comparable or even lower than single high resolution array; and stereo vision provides depth perception capability.

Figure 1A:
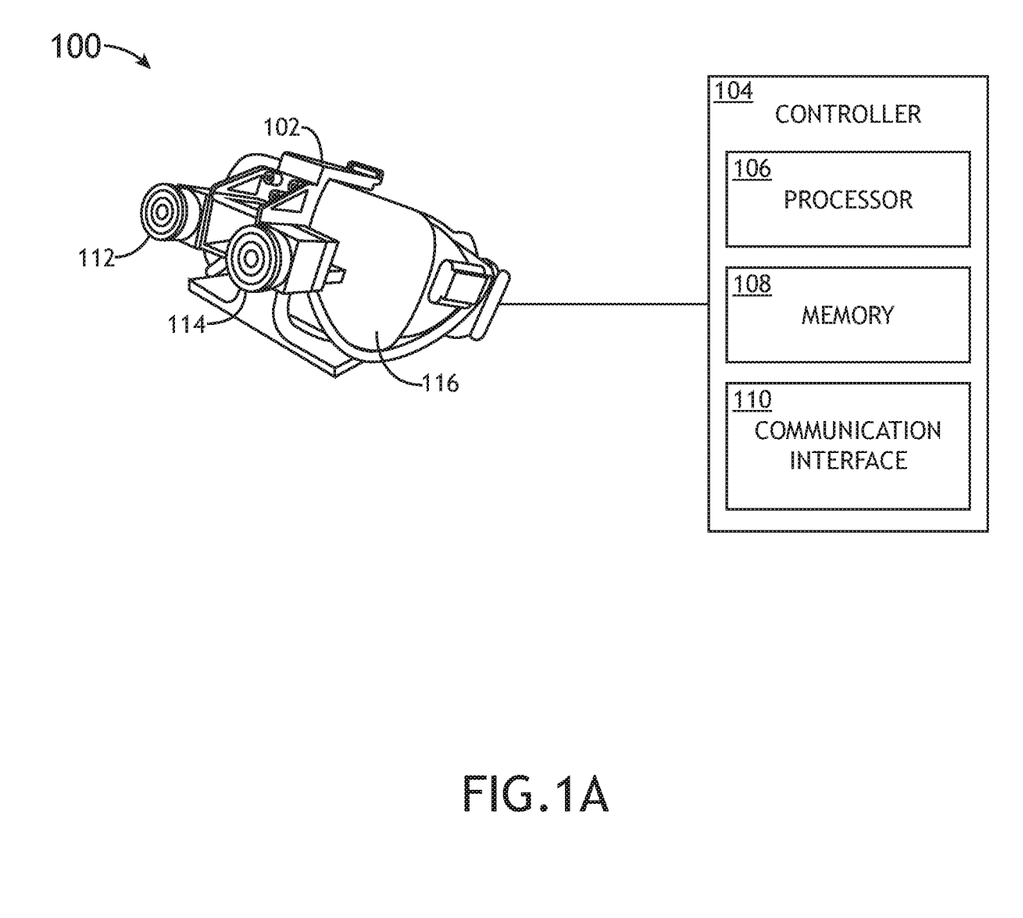
FIG. 1A is a schematic illustrating a head mounted device, in accordance with example embodiments of this disclosure.
Figure 1B:
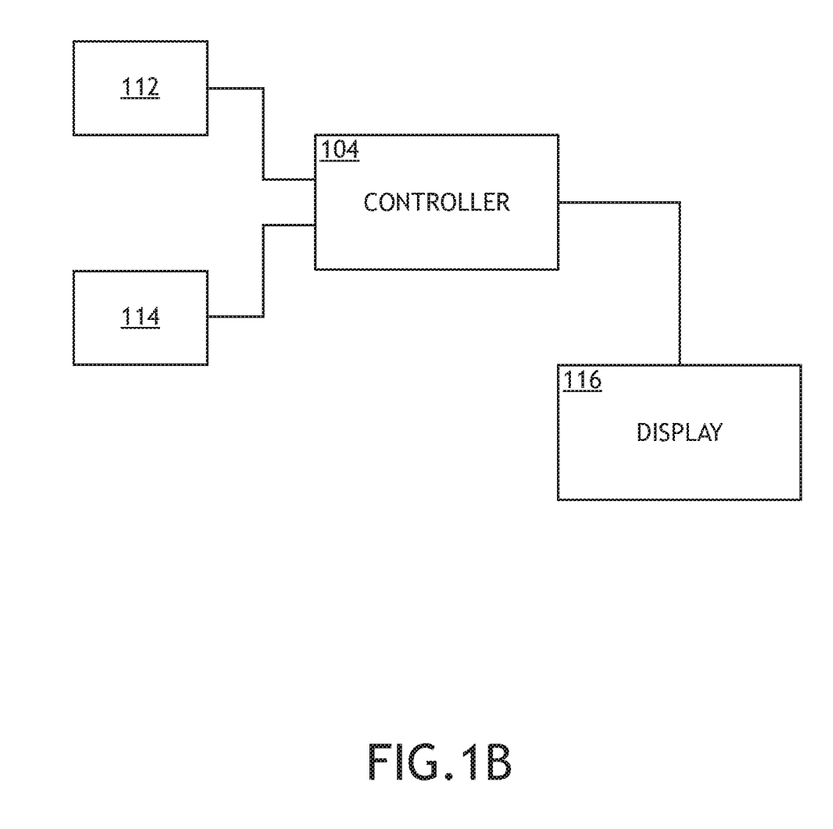
FIG. 1B is a block diagram illustrating a stereoscopic system for the head mounted device, in accordance with example embodiments of this disclosure.
Figure 1C:
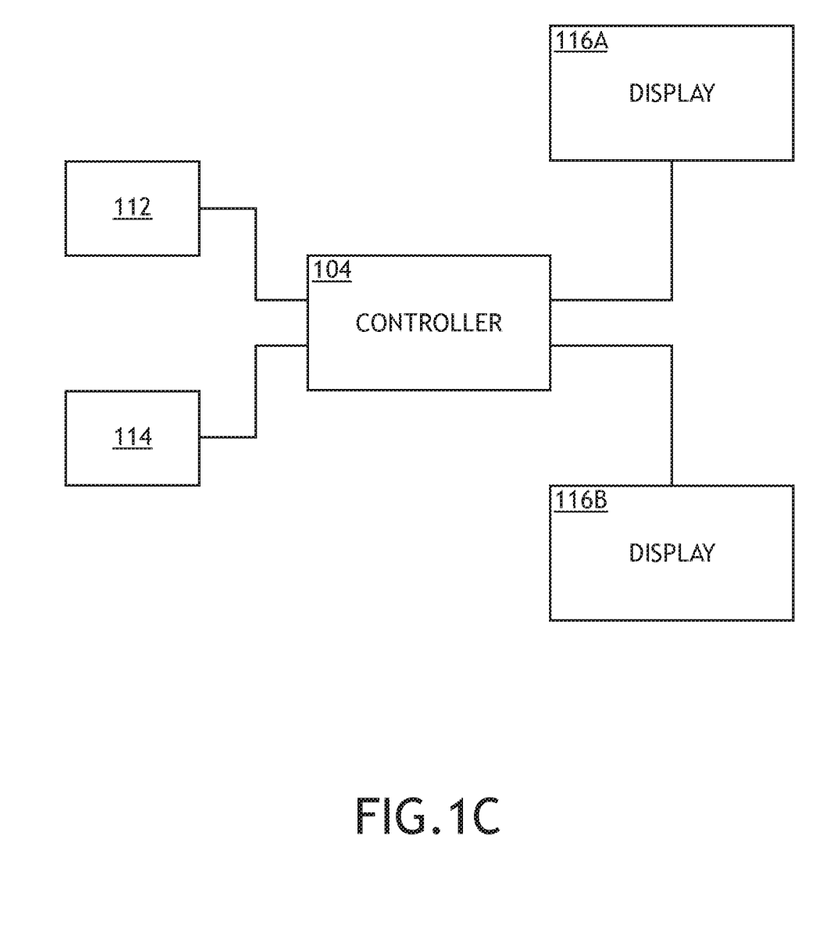
FIG. 1C is a block diagram illustrating a stereoscopic system for the head mounted device, in accordance with example embodiments of this disclosure.
Figure 2:
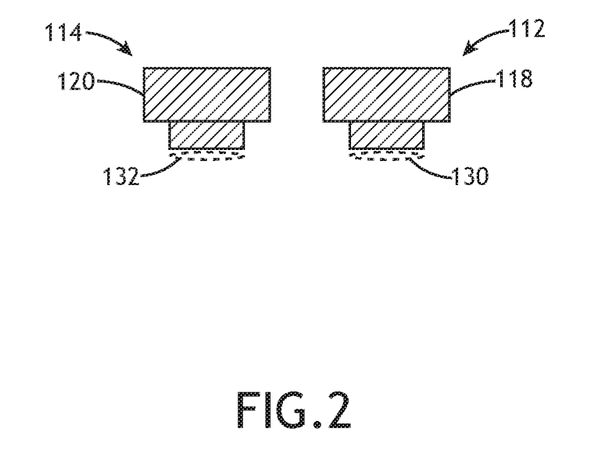
FIG. 2 is a schematic top view illustrating first and second camera assemblies of the stereoscopic system, wherein the first and second camera assemblies include respective infrared cameras, in accordance with example embodiments of this disclosure.

FIG. 1A illustrates a head mounted device 100 including a stereoscopic system (e.g., as illustrated in FIGS. 1B and 1C) that employs two or more infrared cameras for stereo infrared imaging, in accordance with embodiments of this disclosure. In embodiments, the head mounted device 100 may include night vision goggles or glasses (NVG), a night vision helmet, a mixed/augmented reality headset or helmet, any combination thereof, or the like. In some embodiments, the head mounted device 100 may refer to a user device that is not necessarily configured to be "mounted" to a user's head, but is instead temporarily held to a user's head when in use, like binoculars or similar devices. In this regard, the head mounted device 100 may include a headgear 102, such as, but not limited to, a headset, a helmet, a hat, a headband, a visor, a glasses frame, a binocular frame, or the like. Furthermore, in other embodiments, the stereoscopic system may be implemented in other (non-head mounted) devices/systems. For instance, the sensors (e.g., cameras) could be mounted on a remotely piloted vehicle and viewed by a remote operator. Or the sensors could be mounted somewhere on an aircraft or ground vehicle and the imagery provided to an operator. Accordingly, while a stereoscopic system is described within the context of a head mounted device 100, the stereoscopic system can be implemented in a variety of other devices without departing from the scope or spirit of this disclosure.

The head mounted device 100 further includes a stereoscopic camera system implemented by a first camera assembly 112 and a second camera assembly 114 configured to detect stereo imagery. The first camera assembly 112 and the second camera assembly 114 can be coupled to the headgear 102 and configured to detect respective images and/or video streams that are then rendered at one or more displays 116 to generate the stereo imagery (e.g., a stereo video stream or series of stereo images).

The headgear 102 includes and/or is coupled to at least one user-viewable display 116 (e.g., LCD, LED display, OLED display, heads-up display, or the like). In some embodiments, the periphery of the display (or displays) 116 may be occluded so that light cannot enter from the periphery of the display (or displays) 116 when the headgear 102 is in use (e.g., worn on or held up against a user's head). The display 116 may be occluded (as shown) or see-through, for example, as can be implemented using a diffractive optical element or beam splitter. As shown in FIG. 1B, the stereoscopic system may include a single display 116 configured to render imagery from the first camera assembly 112 and the second camera assembly 114 to generate stereoscopic imagery. In some embodiments, imagery from the first camera assembly 112 is rendered at a first portion of the display 116 and imagery from the second camera assembly 114 is rendered at a second portion of the display 116 (e.g., using split-screen technology, or the like). In other embodiments, the imagery from the first camera assembly 112 and the imagery from the second camera assembly 114 at least partially overlap on the display 116, and optical elements, such as filters, polarized lenses, and/or active shutters, are used to direct imagery from the first camera assembly 112 to the user's right eye imagery from the second camera assembly 114 to the user's left eye. As shown in FIG. 1C, the stereoscopic system can alternatively include two or more displays 116, for example, a first display 116A configured to render imagery from the first camera assembly 112 and a second display 116B configured to render imagery from the second camera assembly 114.

In embodiments, the first camera assembly 112, the second camera assembly 114, and the one or more displays 116 are communicatively coupled to at least one controller 104 that is configured to render imagery from the first camera assembly 112 and imagery from the second camera assembly 114 via the one or more displays to generate stereoscopic imagery. As illustrated in FIG. 1A, the controller 104 may include a processor 106, memory 108, and a communication interface 110.

The processor 106 provides processing functionality for at least the controller 104 and can include any number of processors, micro-controllers, circuitry, field programmable gate array (FPGA), application specific integrated circuit (ASIC), or other processing systems, and resident or external memory for storing data, executable code, and other information accessed or generated by the controller 104. The processor 106 can execute one or more software/firmware programs embodied in a non-transitory computer readable medium (e.g., memory 108) that implement techniques described herein. The processor 106 is not limited by the materials from which it is formed or the processing mechanisms employed therein and, as such, can be implemented via semiconductor(s) and/or transistors (e.g., using electronic integrated circuit (IC) components), and so forth.

The memory 108 can be an example of tangible, computer-readable storage medium that provides storage functionality to store various data and/or program code associated with operation of the controller 104/processor 106, such as software programs and/or code segments, or other data to instruct the processor 106, and possibly other components of the controller 104, to perform the functionality described herein. Thus, the memory 108 can store data, such as a program of instructions for operating the controller 104, including its components (e.g., processor 106, communication interface 110, etc.), and so forth. It should be noted that while a single memory 108 is described, a wide variety of types and combinations of memory (e.g., tangible, non-transitory memory) can be employed. The memory 108 can be integral with the processor 106, can comprise stand-alone memory, or can be a combination of both. Some examples of the memory 108 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The communication interface 110 can be operatively configured to communicate with components of the controller 104. For example, the communication interface 110 can be configured to retrieve data from the processor 106 or other devices (e.g., camera assembly 112, camera assembly 114, etc.), transmit data for storage in the memory 108, retrieve data from storage in the memory 108, and so forth. The communication interface 110 can also be communicatively coupled with the processor 106 to facilitate data transfer between components of the controller 104 and the processor 106. It should be noted that while the communication interface 110 is described as a component of the controller 104, one or more components of the communication interface 110 can be implemented as external components communicatively coupled to the controller 104 via a wired and/or wireless connection. The controller 104 can also include and/or connect to one or more input/output (I/O) devices (e.g., via the communication interface 110), such as the one or more displays 116, one or more sensors (e.g., camera assemblies 112 and 114, etc.), an output device (e.g., computer display(s), speaker(s), etc.), an input device (e.g., a mouse, a trackball, a trackpad, a joystick, a touchpad, a touchscreen, a keyboard, a keypad, a microphone (e.g., for voice commands)), and so forth. In embodiments, the communication interface 110 includes or is coupled to a transmitter, receiver, transceiver, physical connection interface, or any combination thereof.

Referring now to FIGS. 2 through 5, various embodiments of the camera assemblies 112 and 114 are illustrated in the drawings and are described herein. In embodiments, the first camera assembly 112 and the second camera assembly 114 include respective first and second infrared cameras 118 and 120. For example, the first camera assembly 112 includes a first infrared camera 118 configured to detect scenery in a FOV of the first infrared camera 118. The second camera assembly 114 includes a second infrared camera 120, which may be configured to detect scenery in the same FOV as the first infrared camera 118. In embodiments, the controller 104 is configured to render imagery (e.g., one or more images, video streams, or the like) from the first infrared camera 118 and imagery from the second infrared camera 120 via the one or more displays 116 (e.g., at a common display 116 or respective right and left eye displays 116A and 116B) to generate stereoscopic infrared imagery that is perceivable by the user. For example, monoscopic imagery from each of the infrared cameras 118 and 120 may be rendered for respective ones of the user's eyes so that stereoscopic imagery is perceived by the user.

The infrared cameras 118 and 120 described herein may be configured to detect light in the near infrared (NIR) (e.g., 740 nm-1 um), short wavelength infrared (SWIR) (e.g., 1 um-3 um), medium wavelength infrared (MWIR) (e.g., 3 um-5 um), long wavelength infrared (LWIR) (e.g., 8 um-14 um, or possibly 5 um-14 um), and/or very long wavelength infrared (VLWIR) (e.g., 14 um-1000 um) bands of the electromagnetic spectrum. In some embodiments, the infrared cameras 118 and 120 are specifically MWIR and/or LWIR cameras.

Figure 3:
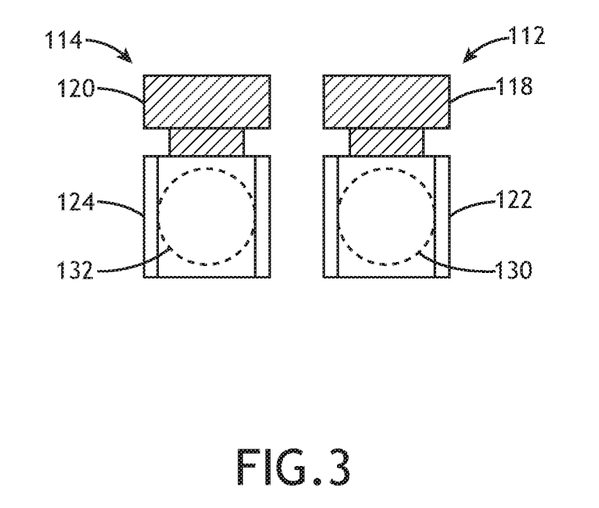
FIG. 3 is a schematic front view illustrating first and second camera assemblies of the stereoscopic system, wherein the first and second camera assemblies include respective infrared cameras and visible spectrum cameras, in accordance with example embodiments of this disclosure.

As shown in FIG. 3, in some embodiments, at least one visible spectrum camera 122/124 is also be coupled to the headgear 102. The visible spectrum camera 122/124 may be configured to detect scenery in the same FOV as the first and second infrared cameras 118 and 120. In embodiments, the controller 104 is further configured to render imagery from the visible spectrum camera 122/124 via the one or more displays 116 to generate combined infrared and visible spectrum imagery and/or to enhance one or more portions of the stereoscopic infrared imagery with the visible spectrum imagery detected by the visible spectrum camera 122/124.

In some embodiments, the head mounted device 100 includes first and second visible spectrum cameras 122 and 124 coupled to the headgear 102. For example, the first camera assembly 112 and the second camera assembly 114 may further include respective first and second visible spectrum cameras 122 and 124. In this regard, the first camera assembly 112 can include a first visible spectrum camera 122, which may be configured to detect scenery in the same FOV as the first and second infrared cameras 118 and 120. Similarly, the second camera assembly 114 can include a second visible spectrum camera 124, which may be configured to detect scenery in the same FOV as the first and second infrared cameras 118 and 120. In embodiments, the controller 104 is configured to render imagery from the first visible spectrum camera 122 and imagery from the second visible spectrum camera 124 via the one or more displays 116 to generate stereoscopic visible spectrum imagery that is perceivable by the user. For example, monoscopic imagery from each of the visible spectrum cameras 122 and 124 may be rendered for respective ones of the user's eyes so that stereoscopic imagery is perceived by the user.

The controller 104 may be configured to generate combined infrared and visible spectrum stereoscopic imagery by rendering the stereoscopic infrared imagery and the stereoscopic visible spectrum imagery simultaneously via the one or more displays 116. For example, the controller 104 may be configured to render imagery from the first infrared camera 118 and imagery from the second infrared camera 120 via the one or more displays 116 along with imagery from the first visible spectrum camera 122 and imagery from the second visible spectrum camera 124 via the one or more displays 116 to generate combined infrared and visible spectrum stereoscopic imagery that is perceivable by the user. In this regard, monoscopic imagery from the respective infrared cameras 118 and 120 and the respective visible spectrum cameras 122 and 124 in each of the camera assemblies 112 and 114 may be rendered for respective ones of the user's eyes so that combined infrared and visible spectrum stereoscopic imagery is perceived by the user. In other embodiments, the controller 104 may be configured to generate combined infrared and visible spectrum stereoscopic imagery via one or more image processing algorithms.

In some embodiments, in place of or in addition to at least one visible spectrum camera 122/124, the stereoscopic system may include one or more additional infrared cameras. For example, the stereoscopic system may include additional infrared cameras with differing spectral sensitivities than the first and second infrared cameras 118 and 120. In this regard, the visible spectrum cameras 122 and 124 may be replaced by additional infrared cameras in any of the embodiments described herein. In embodiments, the stereoscopic system may include a combination of SWIR and LWIR cameras, MWIR and LWIR cameras, SWIR and MWIR cameras, or any combination of infrared cameras and/or visible spectrum cameras with differing spectral sensitivities.

Figure 4A:
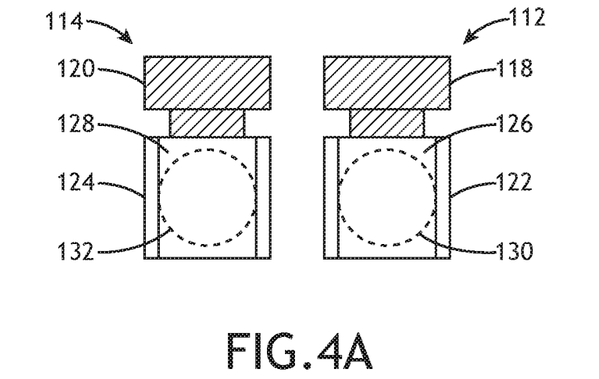
FIG. 4A is a schematic front view illustrating first and second camera assemblies of the stereoscopic system, wherein the first and second camera assemblies include respective infrared cameras and visible spectrum cameras with a common aperture per camera assembly, in accordance with example embodiments of this disclosure.
Figure 4B:
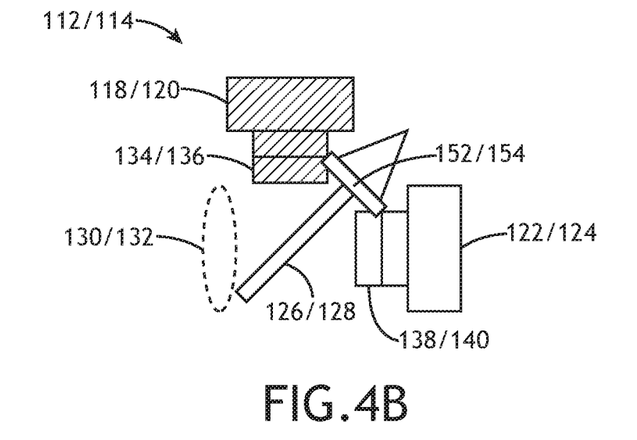
FIG. 4B is a schematic side view illustrating a camera assembly with a common aperture for an infrared camera and visible spectrum camera of the camera assembly, in accordance with example embodiments of this disclosure.
Figure 4C:
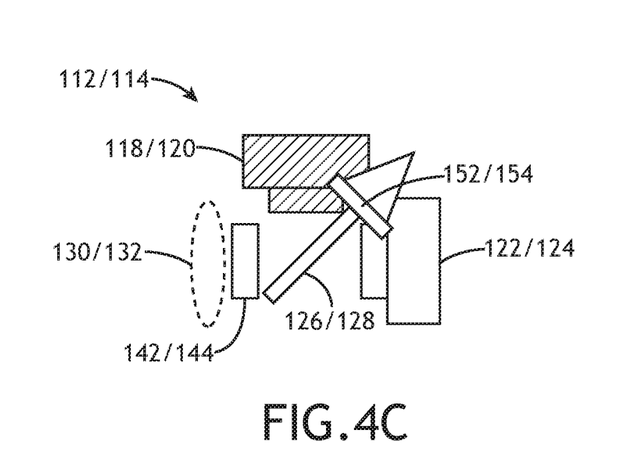
FIG. 4C is a schematic side view illustrating a camera assembly with a common aperture for an infrared camera and visible spectrum camera of the camera assembly, in accordance with example embodiments of this disclosure.

Various embodiments of the camera assemblies 112 and 114 are also illustrated in FIGS. 4A through 4C, were cameras in each assembly share a common aperture. For example, in the embodiments shown in FIGS. 4A through 4C, the first infrared camera 118 and the first visible spectrum camera 122 share a first common aperture 130, and the second infrared camera 120 and the second visible spectrum camera 124 share a second common aperture 132. In addition, the first infrared camera 118 and the first visible spectrum camera 122 can share a first common focusing mechanism 152 (e.g., a manual or automatic focus module), and the second infrared camera 120 and the second visible spectrum camera 124 can share a second common focusing mechanism 154.

In embodiments, the first assembly 112 includes a first beam splitter 126 that is configured to receive light via the first common aperture 130 and is further configured to direct respective portions of the light received via the first common aperture 130 to the first infrared camera 118 and the first visible spectrum camera 122. As shown in FIGS. 4A and 4B, the respective portions of light may be directed from the first beam splitter 126 into respective focusing optics 134 for the first infrared camera 118 and respective focusing optics 138 for the first visible spectrum camera 122, then transmitted into the sensor arrays of the cameras 118 and 122 themselves. Alternatively, as shown in FIG. 4C, the shared focusing optics 142 may transmit focused light back to the first beam splitter 126, which then directs respective spectral portions of the focused light to the first infrared camera 134/118 and the first visible spectrum camera 138/122.

Similarly, the second assembly 114 may include a second beam splitter 128 that is configured to receive light via the second common aperture 132 and is further configured to direct respective portions of the light received via the second common aperture 132 to the second infrared camera 120 and the second visible spectrum camera 124. As shown in FIG. 4B, the respective portions of light may be directed from the second beam splitter 128 into respective focusing optics 136 for the second infrared camera 120 and respective focusing optics 140 for the second visible spectrum camera 124, then transmitted into the sensor arrays of the cameras 120 and 124 themselves. Alternatively, as shown in FIG. 4C, the shared focusing optics 144 may transmit focused light back to the second beam splitter 128, which then directs respective spectral portions of the focused light to the second infrared camera 136/120 and the second visible spectrum camera 140/124.

The visible spectrum cameras 122 and 124 described herein may be configured to detect light in the visible (VIS) (e.g., 350 nm-740 nm) band of the electromagnetic spectrum. In some embodiments, the visible spectrum cameras 122 and 124 are low light level (LLL) cameras, which may be capable of detecting NIR and/or SWIR bands of the electromagnetic spectrum (e.g., wavelengths up to 1 um, and possibly higher).

Figure 5:
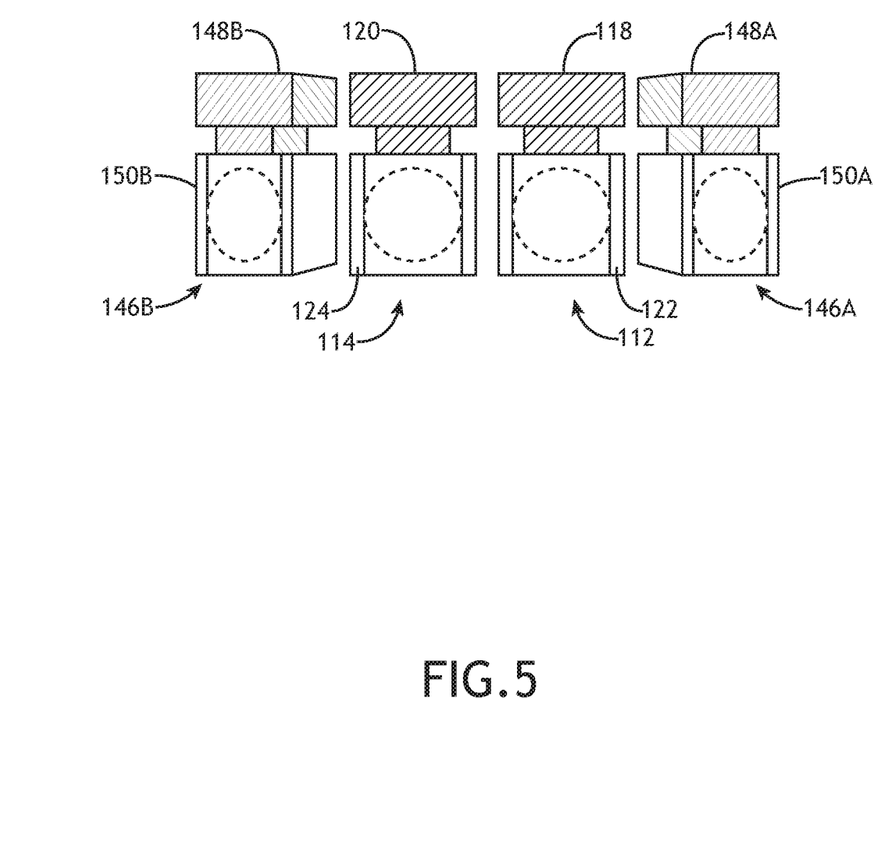
FIG. 5 is a schematic front view illustrating first and second camera assemblies of the stereoscopic system with one or more additional camera assemblies to extend FOV with monoscopic imagery detected by the one or more additional camera assemblies, in accordance with example embodiments of this disclosure.

Referring now to FIG. 5, in some embodiments, the head mounted device 100 may include one or more additional camera assemblies 146 (e.g., camera assemblies 146A and 146B) configured to detect scenery in one or more additional FOVs different from the FOV of the first and second camera assemblies 112 and 114. Additional camera assemblies 146 may be structured similarly to the first and second camera assemblies 112 and 114. For example, additional camera assemblies 146 may include respective infrared cameras 148 and/or visible spectrum cameras 150. The infrared cameras 148 and/or visible spectrum cameras 150 of the additional camera assemblies 146 can also be configured in a similar manner to those of the first and second camera assemblies 112 and 114, for example, as described with reference to any of FIGS. 2 through 4C, or any combination thereof. In an example embodiment, the head mounted device 100 includes a first additional camera assembly 146A including an additional infrared camera 148A and/or an additional visible spectrum camera 150A. In another example embodiment, the head mounted device 100 further includes a second additional camera assembly 146B including an additional infrared camera 148B and/or an additional visible spectrum camera 150B. The head mounted device 100 may include any number of additional camera assemblies 146 configured to detect scenery in one or more additional FOVs different from the FOV of the first and second camera assemblies 112 and 114 in order to enhance a user-perceived FOV with monoscopic imagery detected beyond the FOV of the first and second camera assemblies 112 and 114.

In embodiments, the controller 104 is configured to render imagery from the one or more additional camera assemblies 146 via the one or more displays 116 to enhance the user-perceived FOV with the monoscopic imagery. For example, the controller 104 may be configured to render monoscopic imagery from camera assembly 146A via the one or more displays 116 so that the imagery is viewable by the user's left eye and may be configured to render monoscopic imagery from camera assembly 146B via the one or more displays 116 so that the imagery is viewable by the user's right eye, thereby expanding the user-perceived FOV with monoscopic imagery to the right and left beyond the stereoscopic imagery generated based on scenery detected in the FOV of the first and second camera assemblies 112 and 114.

In some embodiments, rather than enhancing the user-perceived FOV with monoscopic imagery, the additional camera assemblies 146 may be replaced by one or more additional stereo camera pairs configured to detect scenery in one or more additional FOVs different from the FOV of the first and second camera assemblies 112 and 114. For example, the first and second camera assemblies 112 and 114 can be the center stereo pair, and the stereoscopic system can further include a left stereo pair (in place of camera assembly 146A), and a right stereo pair (in place of camera assembly 146B). In this manner, the user-perceived FOV can be enhanced with stereovision in all three quadrants. For example, the controller 104 can be configured to render imagery from the one or more additional stereo camera pairs via the one or more displays 116 to enhance the user-perceived FOV with stereoscopic imagery detected beyond the FOV of the first and second camera assemblies 112 and 114.

FIGS. 6A through 6D illustrate example implementations of a method 200 that employs the head mounted device 100/stereoscopic system described herein. In general, operations of disclosed processes (e.g., method 200) may be performed in an arbitrary order, unless otherwise provided in the claims.

Figure 6A:
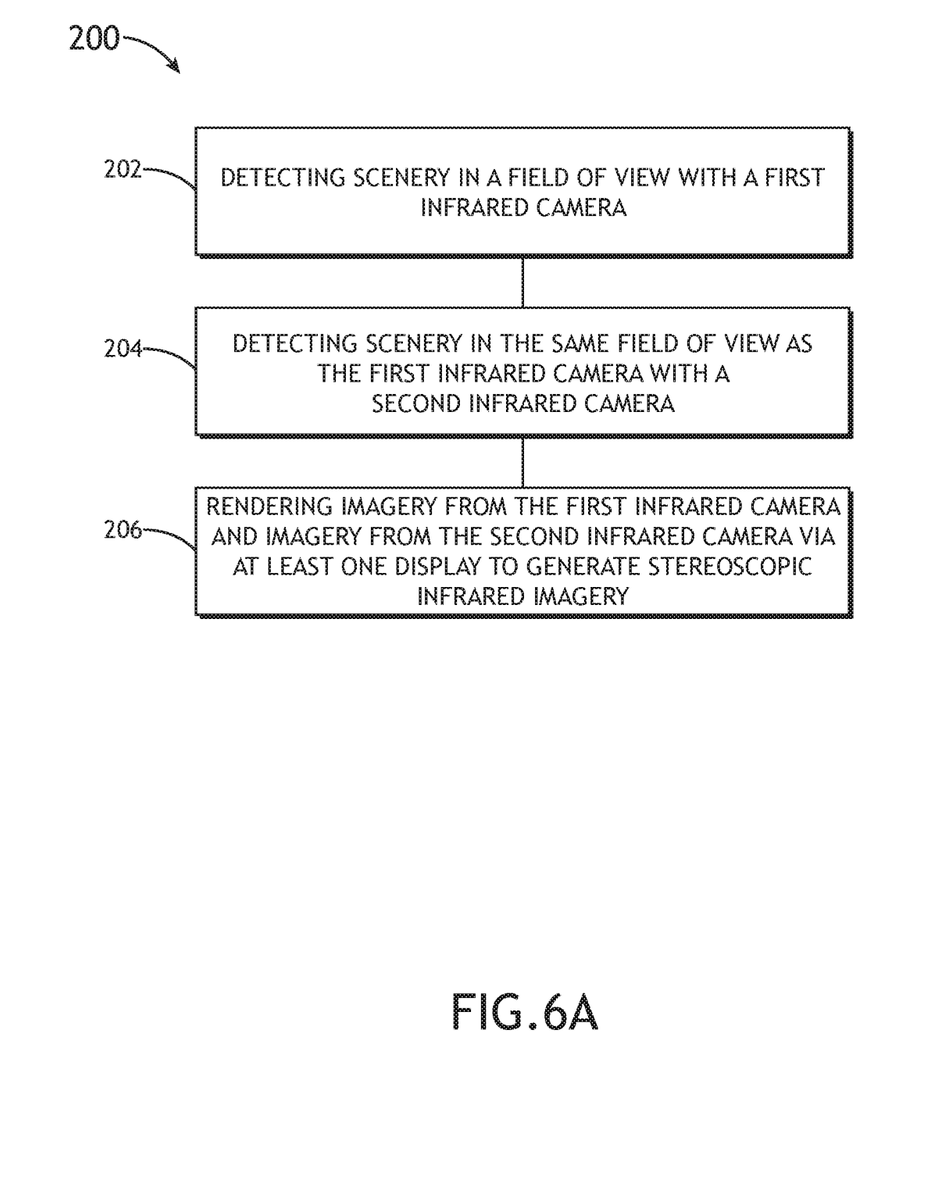
FIG. 6A is a flow diagram illustrating an example implementation of a method for stereoscopic imaging with a stereoscopic system, such as the stereoscopic system illustrated in any of FIGS. 1A through 5, or a combination thereof.

As shown in FIG. 6A, the method 200 includes detecting scenery in a FOV with a first infrared camera 118 (block 202), and detecting scenery in the same FOV with a second infrared camera 120 (block 204). Imagery from the first infrared camera 118 and imagery from the second infrared camera 120 are then rendered via one or more displays 116 to generate stereoscopic infrared imagery (block 206).

Figure 6B:
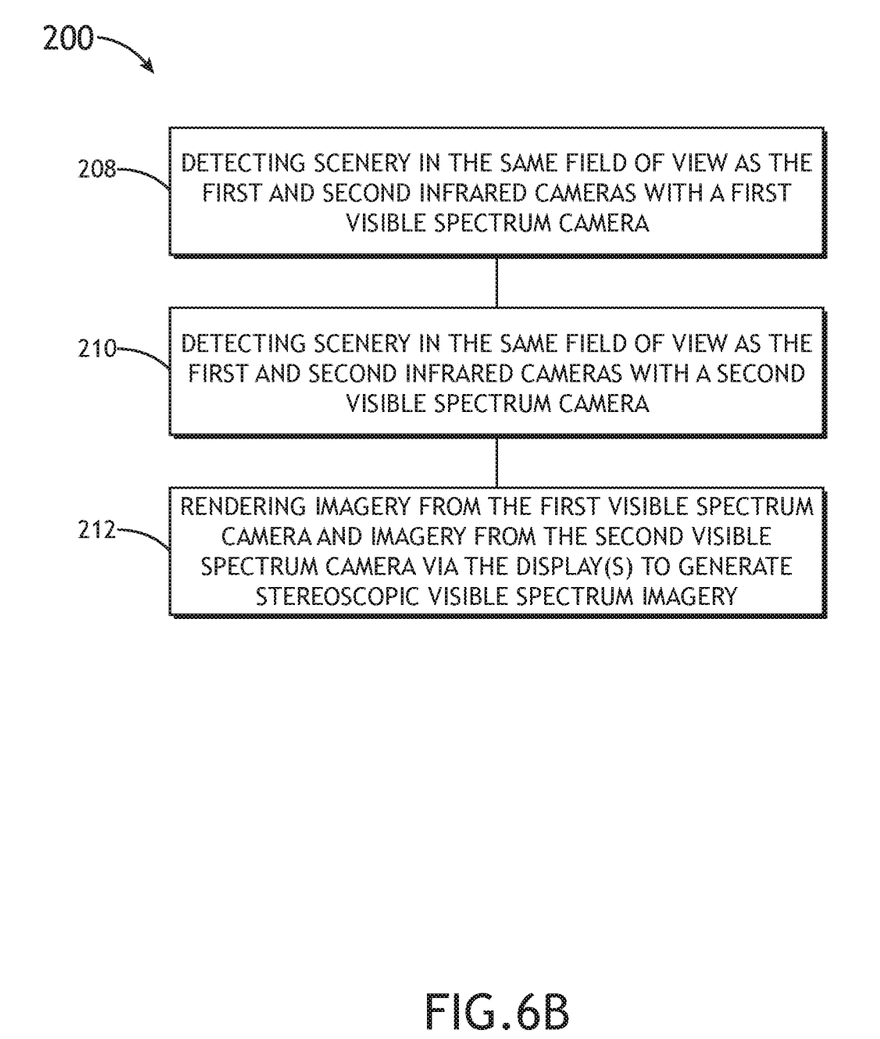
FIG. 6B is a flow diagram illustrating additional steps of the method of FIG. 6A, in accordance with example implementations of this disclosure.

As shown in FIG. 6B, in some implementations, the method 200 may further include detecting scenery in the same FOV as the first and second infrared cameras with a first visible spectrum camera 122 (block 208), and also detecting scenery in the same FOV with a second visible spectrum camera 124 (block 210). Imagery from the first visible spectrum camera 122 and imagery from the second visible spectrum camera 124 are then rendered via one or more displays 116 to generate stereoscopic visible spectrum imagery (block 212). In some implementations, combined infrared and visible spectrum stereoscopic imagery is generated by rendering the stereoscopic infrared imagery and the stereoscopic visible spectrum imagery simultaneously via the one or more displays 116.

Figure 6C:
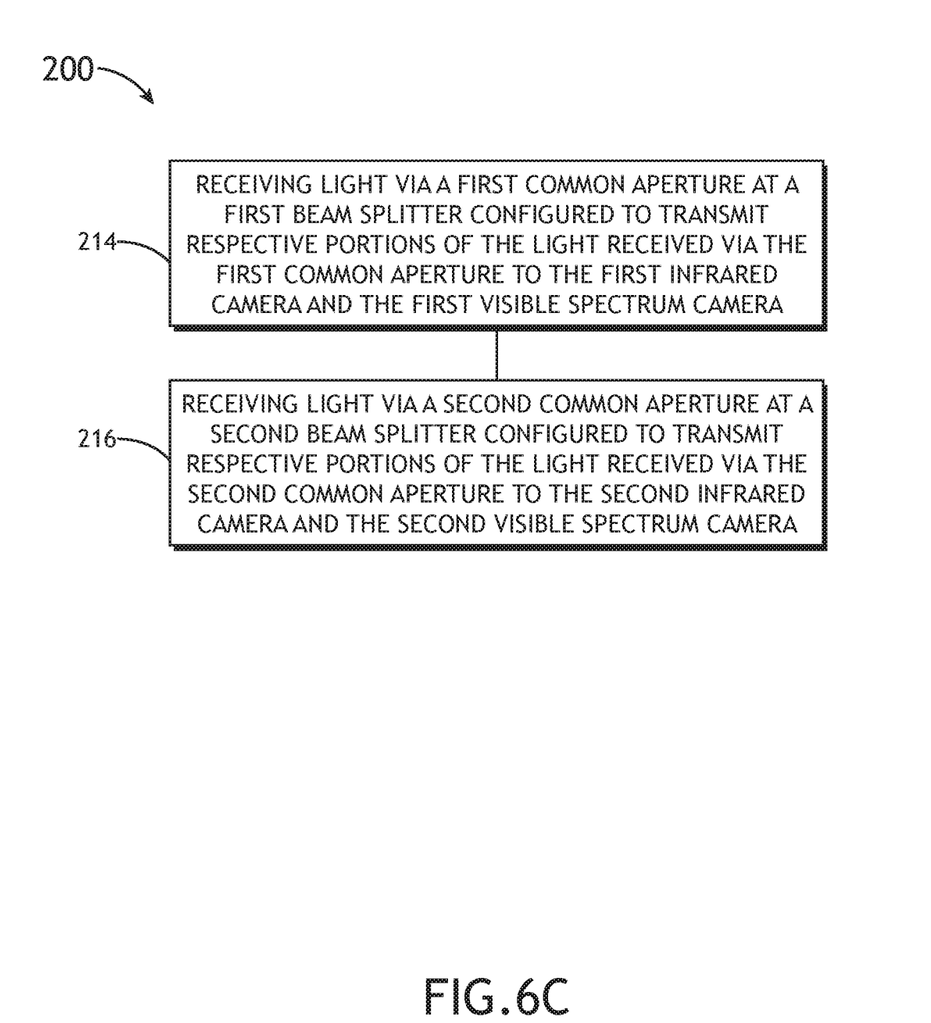
FIG. 6C is a flow diagram illustrating additional steps of the method of FIG. 6A, in accordance with example implementations of this disclosure.

In some implementations, the first infrared camera 118 and the first visible spectrum camera 122 may share a first common aperture 130, and the second infrared camera 120 and the second visible spectrum camera 124 may share a second common aperture 132. In such cases, as shown in FIG. 6C, the method 200 may further include receiving light via the first common aperture 130 at a first beam splitter 126 configured to direct respective portions of the light received via the first common aperture 130 to the first infrared camera 118 and the first visible spectrum camera 122 (block 214), and receiving light via the second common aperture 132 at a second beam splitter 128 configured to direct respective portions of the light received via the second common aperture 132 to the second infrared camera 120 and the second visible spectrum camera 124 (block 216). In implementations, these blocks of the method 200 are performed as part of blocks 202, 204, 208, and 210, which may at least partially be performed in parallel with one another.

Figure 6D:
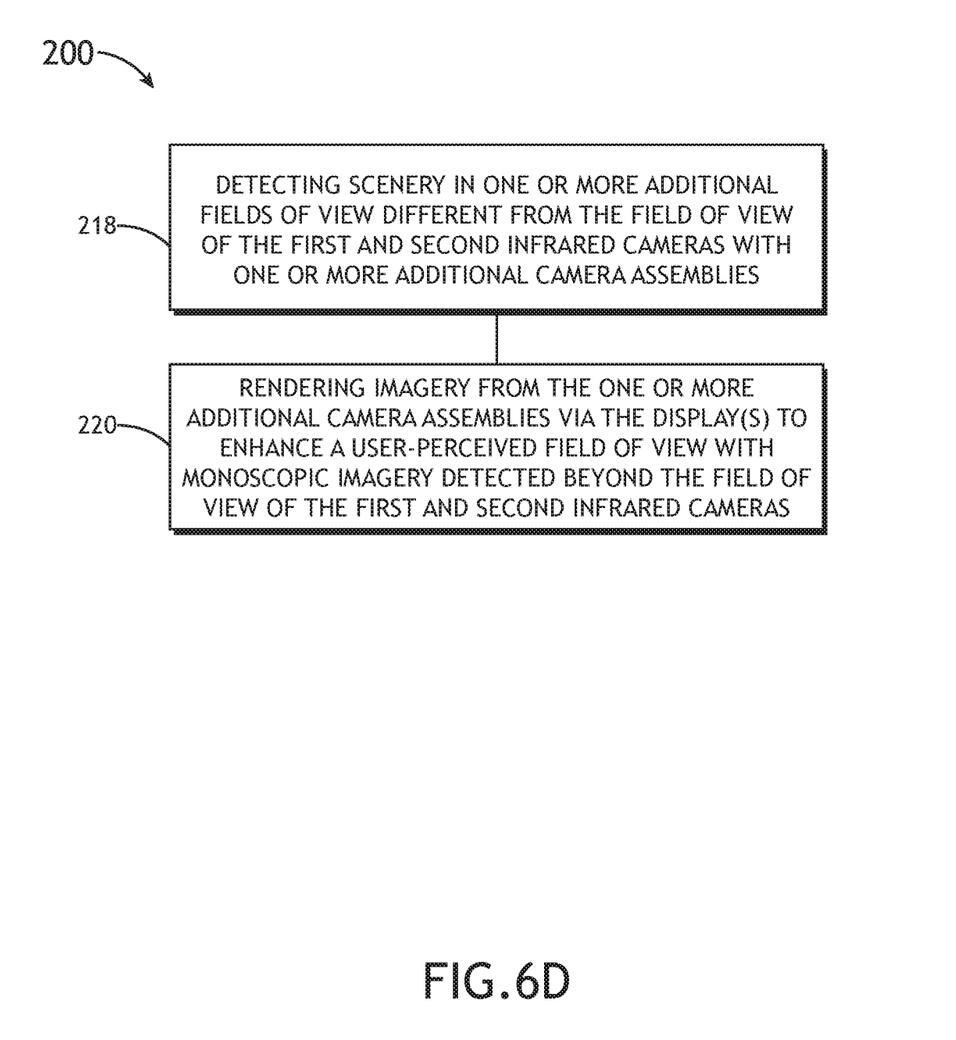
FIG. 6D is a flow diagram illustrating additional steps of the method of FIG. 6A, in accordance with example implementations of this disclosure.

As shown in FIG. 6D, in some implementations, the method 200 may further include detecting scenery in one or more additional FOVs different from the FOV of the first and second infrared cameras 118 and 120 with one or more additional camera assemblies 146 including respective infrared and/or visible spectrum cameras (block 218). Imagery from the one or more additional camera assemblies 146 is then rendered via the one or more displays 116 to enhance a user-perceived FOV with monoscopic imagery detected beyond the FOV of the first and second infrared cameras 118 and 120 (block 220).

The method 200 may further include any step or operation implied or required by the embodiments of the head mounted device 100/stereoscopic system described herein. The head mounted device 100/stereoscopic system can also include any additional component or functionality expressed or implied by the method 200.

It is to be understood that implementations of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some implementations, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to achieve the objectives and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A head mounted device, comprising:
   a headgear;
   a first infrared camera coupled to the headgear and configured to detect scenery in a field of view;
   a second infrared camera coupled to the headgear and configured to detect scenery in the same field of view as the first infrared camera, wherein a resolution of the first infrared camera is the same as a resolution of the second infrared camera;
   at least one visible spectrum camera coupled to the headgear and configured to detect scenery in the same field of view as the first and second infrared cameras;
   a single display coupled to the headgear; and
   at least one controller configured to render imagery from the first infrared camera, imagery from the second infrared camera, and imagery from the at least one visible camera via the single display to generate stereoscopic infrared imagery, the at least one controller further configured to render imagery from the at least one visible spectrum camera via the single display,
   wherein a timing of the first infrared camera is offset from a timing of the second infrared camera by one-half frame time so that half of the stereoscopic infrared imagery is updated at two times a frame rate of the first infrared camera and two times a frame rate of the second infrared camera.

2. The head mounted device of claim 1, wherein the at least one visible spectrum camera includes:
   a first visible spectrum camera coupled to the headgear and configured to detect scenery in the same field of view as the first and second infrared cameras; and
   a second visible spectrum camera coupled to the headgear and configured to detect scenery in the same field of view as the first and second infrared cameras,
   wherein the at least one controller is further configured to render imagery from the first visible spectrum camera and imagery from the second visible spectrum camera via the single display to generate stereoscopic visible spectrum imagery.

3. The head mounted device of claim 2, wherein the controller is configured to generate combined infrared and visible spectrum stereoscopic imagery by rendering the stereoscopic infrared imagery and the stereoscopic visible spectrum imagery via the single display.

4. The head mounted device of claim 2, wherein the first infrared camera and the first visible spectrum camera have a first common aperture, and the second infrared camera and the second visible spectrum camera have a second common aperture.

5. The head mounted device of claim 4, further comprising:
   a first camera assembly including:
      the first infrared camera;
      the first visible spectrum camera; and
      a first beam splitter configured to receive light via the first common aperture and further configured to direct respective portions of the light received via the first common aperture to the first infrared camera and the first visible spectrum camera; and
   a second camera assembly including:
      the second infrared camera;
      the second visible spectrum camera; and
      a second beam splitter configured to receive light via the second common aperture and further configured to direct respective portions of the light received via the second common aperture to the second infrared camera and the second visible spectrum camera.

6. The head mounted device of claim 5, further comprising:
   one or more additional camera assemblies including at least one of an additional infrared camera or an additional visible spectrum camera, the one or more additional camera assemblies configured to detect scenery in one or more additional fields of view different from the field of view of the first and second camera assemblies,
   wherein the at least one controller is further configured to render imagery from the one or more additional camera assemblies via the single display to enhance a user-perceived field of view with monoscopic imagery detected beyond the field of view of the first and second camera assemblies.

7. A stereoscopic system, comprising:
   a first infrared camera configured to detect scenery in a field of view;
   a second infrared camera configured to detect scenery in the same field of view as the first infrared camera, wherein a resolution of the first infrared camera is the same as a resolution of the second infrared camera;
   at least one visible spectrum camera configured to detect scenery in the same field of view as the first and second infrared cameras;
   a single display; and
   at least one controller configured to render imagery from the first infrared camera and imagery from the second infrared camera via the single display to generate stereoscopic infrared imagery, the at least one controller further configured to render imagery from the at least one visible spectrum camera via the single display,
   wherein a timing of the first infrared camera is offset from a timing of the second infrared camera by one-half frame time so that half of the stereoscopic infrared imagery is updated at two times a frame rate of the first infrared camera and two times a frame rate of the second infrared camera.

8. The stereoscopic system of claim 7, wherein the at least one visible spectrum camera includes:
   a first visible spectrum camera configured to detect scenery in the same field of view as the first and second infrared cameras; and
   a second visible spectrum camera configured to detect scenery in the same field of view as the first and second infrared cameras, wherein the at least one controller is further configured to render imagery from the first visible spectrum camera and imagery from the second visible spectrum camera via the single display to generate stereoscopic visible spectrum imagery.

9. The stereoscopic system of claim 8, wherein the controller is configured to generate combined infrared and visible spectrum stereoscopic imagery by rendering the stereoscopic infrared imagery and the stereoscopic visible spectrum imagery via the single display.

10. The stereoscopic system of claim 8, wherein the first infrared camera and the first visible spectrum camera have a first common aperture, and the second infrared camera and the second visible spectrum camera have a second common aperture.

11. The stereoscopic system of claim 10, further comprising:
   a first camera assembly including:
      the first infrared camera;
      the first visible spectrum camera; and
      a first beam splitter configured to receive light via the first common aperture and further configured to direct respective portions of the light received via the first common aperture to the first infrared camera and the first visible spectrum camera; and
   a second camera assembly including:
      the second infrared camera;
      the second visible spectrum camera; and
      a second beam splitter configured to receive light via the second common aperture and further configured to direct respective portions of the light received via the second common aperture to the second infrared camera and the second visible spectrum camera.

12. The stereoscopic system of claim 11, further comprising:
   one or more additional camera assemblies including at least one of an additional infrared camera or an additional visible spectrum camera, the one or more additional camera assemblies configured to detect scenery in one or more additional fields of view different from the field of view of the first and second camera assemblies,
   wherein the at least one controller is further configured to render imagery from the one or more additional camera assemblies via the single display to enhance a user-perceived field of view with monoscopic imagery detected beyond the field of view of the first and second camera assemblies.

13. The stereoscopic system of claim 11, further comprising:
   one or more additional stereo camera pairs configured to detect scenery in one or more additional fields of view different from the field of view of the first and second camera assemblies,
   wherein the at least one controller is further configured to render imagery from the one or more additional stereo camera pairs via the single display to enhance a user-perceived field of view with stereoscopic imagery detected beyond the field of view of the first and second camera assemblies.

14. A method for stereoscopic imaging, comprising:
   detecting scenery in a field of view with a first infrared camera;
   detecting scenery in the same field of view as the first infrared camera with a second infrared camera, wherein a resolution of the first infrared camera is the same as a resolution of the second infrared camera;
   detecting imagery in the same field of view as the first infrared camera and the second infrared camera with at least one visible spectrum camera;
   rendering imagery from the first infrared camera and imagery from the second infrared camera via a single display to generate stereoscopic infrared imagery; and
   rendering imagery from the at least one visible spectrum camera via the single display,
   wherein a timing of the first infrared camera is offset from a timing of the second infrared camera by one-half frame time so that half of the stereoscopic infrared imagery is updated at two times a frame rate of the first infrared camera and two times a frame rate of the second infrared camera.

15. The method of claim 14, further comprising:
   detecting scenery in the same field of view as the first and second infrared cameras with a first visible spectrum camera;
   detecting scenery in the same field of view as the first and second infrared cameras with a second visible spectrum camera; and
   rendering imagery from the first visible spectrum camera and imagery from the second visible spectrum camera via the single display to generate stereoscopic visible spectrum imagery.

16. The method of claim 15, wherein combined infrared and visible spectrum stereoscopic imagery is generated by rendering the stereoscopic infrared imagery and the stereoscopic visible spectrum imagery via the single display.

17. The method of claim 15, further comprising:
   receiving light via a first common aperture at a first beam splitter configured to direct respective portions of the light received via the first common aperture to the first infrared camera and the first visible spectrum camera; and
   receiving light via a second common aperture at a second beam splitter configured to direct respective portions of the light received via the second common aperture to the second infrared camera and the second visible spectrum camera.

18. The method of claim 14, further comprising:
   detecting scenery in one or more additional fields of view different from the field of view of the first and second infrared cameras with one or more additional camera assemblies including at least one of an additional infrared camera or an additional visible spectrum camera; and
   rendering imagery from the one or more additional camera assemblies via the single display to enhance a user-perceived field of view with monoscopic imagery detected beyond the field of view of the first and second infrared cameras.

19. The head mounted device of claim 1, wherein at least the stereoscopic imagery is presented by the single display such that a merged stereoscopic image is observed including at least the imagery from the first infrared camera and the imagery from the second infrared camera.

* * * * *